March 7, 1933. H. J. MILLS 1,900,837
SPRAYING APPARATUS
Filed Sept. 8, 1931 2 Sheets-Sheet 2
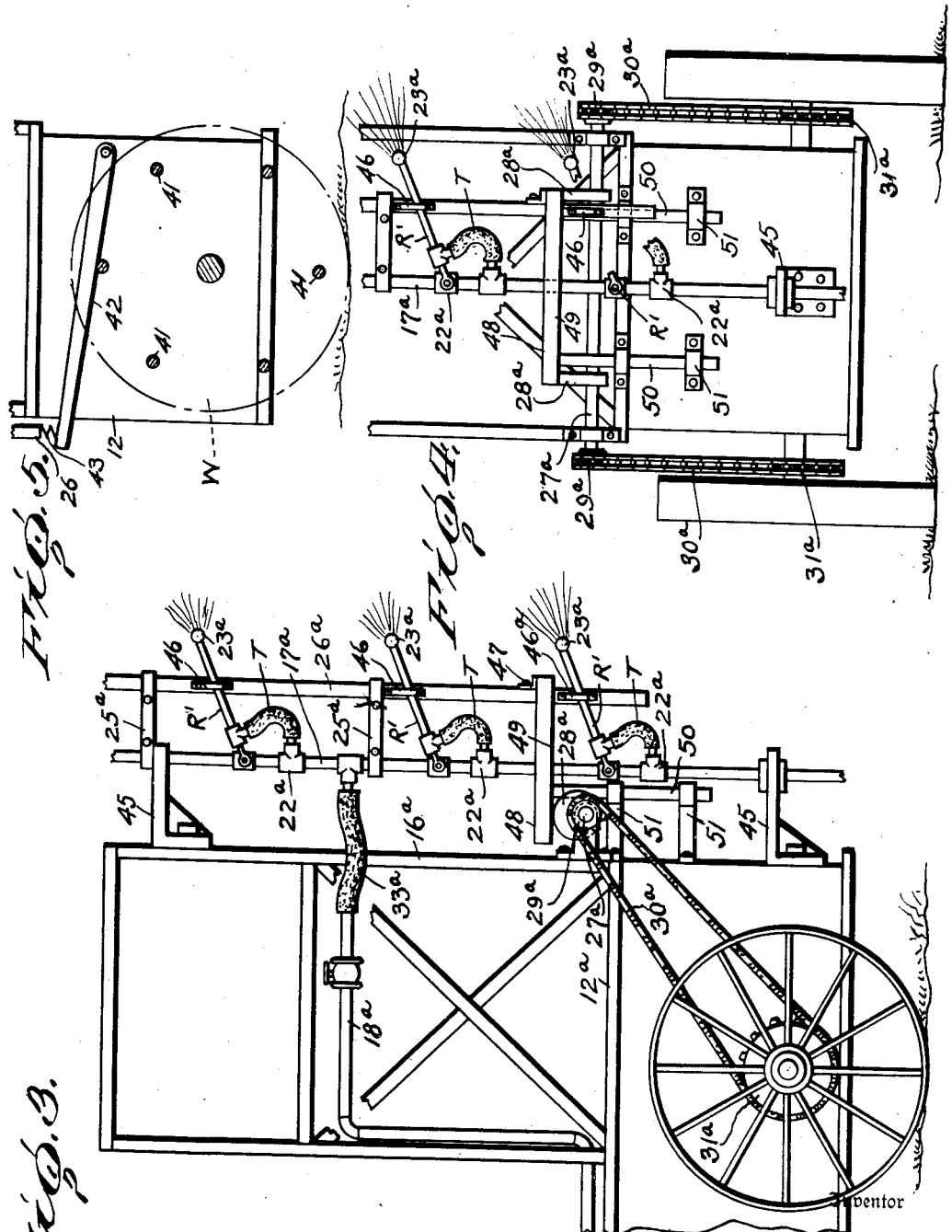

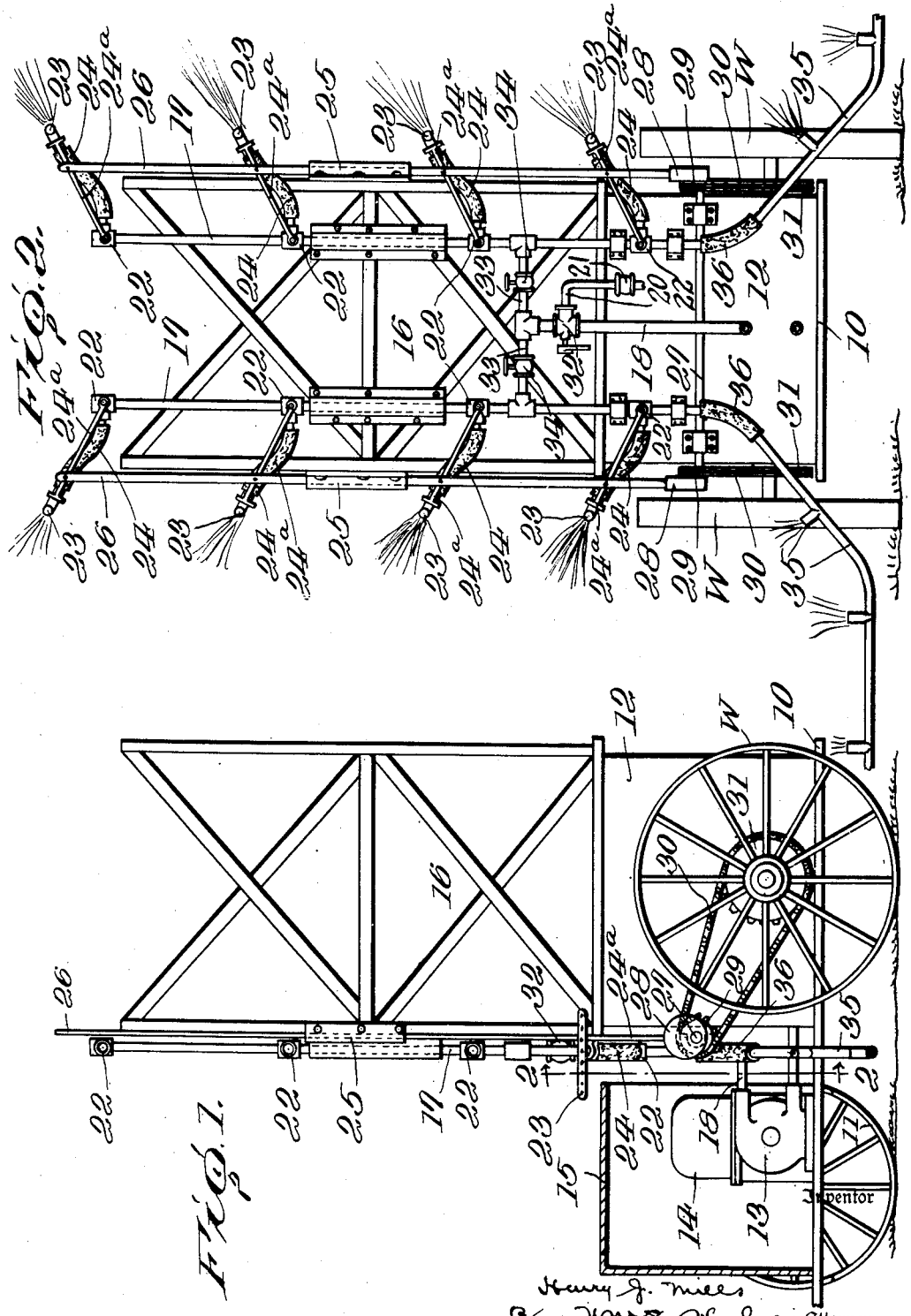

Patented Mar. 7, 1933

1,900,837

UNITED STATES PATENT OFFICE

HENRY J. MILLS, OF KINDERHOOK, NEW YORK

SPRAYING APPARATUS

Application filed September 8, 1931. Serial No. 561,752.

This invention is primarily designed as an apparatus of the travelling type, for use in spraying fruit and other trees and similar vegetation, but not limited to this particular type.

One of the objects of the invention is to provide a spraying apparatus which may be conveniently drawn through the area containing the vegetation to be sprayed, and provided with means for effectively applying the spray material during the travel of said apparatus. A further object is to provide an apparatus of the character mentioned having simple means for applying a reciprocating movement to the spray nozzles, so as to insure a uniform and complete coverage of the surfaces to be sprayed.

The invention will be hereinafter fully set forth and particularly pointed out in the claims.

In the accompanying drawings:—

Figure 1 is a side elevation illustrating an apparatus constructed in accordance with the invention. Figure 2 is a vertical sectional view on the line 2—2, Figure 1, looking to the right. Figures 3 and 4 are side and rear views respectively, illustrating a slight modification. Figure 5 is a detail view illustrating a modified means for imparting reciprocation to the spray nozzle.

Referring to the drawings, 10 designates a truck mounted upon suitable carrying wheels 11, so that it may be conveniently drawn from place to place by means of a traction engine, team of horses, or otherwise. Mounted on said truck is a tank 12 for containing a liquid spray material, and adjacent said tank is supported a pump 13, which may be operated in suitable manner, as by means of an internal combustion engine 14, as shown. The engine and pump are normally enclosed in a housing 15, as shown.

In the form of the invention illustrated in Figures 1 and 2, a tower-like frame-work 16 is mounted upon the top of the tank 12, said frame-work having means to fixedly support vertically disposed conduits 17, 17, as shown. Each of said conduits is connected by a suitable branch pipe with the delivery pipe 18 of the pump, the supply pipe for said pump being connected with the interior of said tank 12. The delivery pipe 18 is provided with a by-pass 20 connected with the interior of the tank, said by-pass having a check-valve therein of any desired construction, so arranged that when flow of the spray fluid through the branch pipes to the conduits 17 is prevented, the said fluid will merely by-pass into the tank without interfering with the operations of the engine and pump. The check valve is diagrammatically illustrated at 21.

Each conduit 17 is provided with one or more outlet nipples 22, to each of which is flexibly connected a spray head 23 of any desired construction. The flexible connection may be of any desired character, but as shown consists in each instance of a section of flexible tubing 24, which not only serves to operatively connect the spray head with the conduit, but also permits relative movement of the spray head with respect to the conduit. The spray heads are each supported by a rod 24ª pivoted at one end to a conduit 17 and provided at its other end with a yoke which grasps the spray head. Slidably mounted in guides 25 carried by the frame-work 16 are actuator members 26, preferably in the form of rods which are movably connected in suitable manner with the respective rods 24ª, so that vertical reciprocatory movement imparted to said actuator members will impart a simultaneous swinging movement to all of the spray heads.

The actuator members 26 may be reciprocated in any suitable manner, but it is preferred to provide a rotatably mounted transversely disposed shaft 27, as shown in Figures 1 and 2, said shaft carrying cams 28, one for each actuator member 26. The shaft is also provided with a sprocket wheel 29 connected by a sprocket chain 30 with a driving sprocket 31 carried by one of the driving wheels W of the truck.

The flow of fluid through the delivery pipe 18 to the conduits is controlled by a lever valve of any desired structure conventionally shown at 32, preferably of the type which is normally biased to its seat by spring pressure, and having its lever so positioned that it may be engaged by the foot of the operator to temporarily maintain the valve in open position, when it is desired to apply the spray material to the vegetation to be treated. Each branch pipe 33 leading from delivery pipe 18 to a conduit 17 is individually controlled by a hand valve 34, as shown.

Connected with the lower end of each of the conduits 17 is a supplemental spray pipe 35, shaped to extend laterally from the truck close to the ground, so that it may direct the spray material in a vertical position beneath adjacent vegetation. The supplemental spray pipe is movably connected with the conduit 17 in suitable manner, as by means of a flexible hose 36, so that it may be folded to a vertical position when not in use.

In operation, the truck 10 is drawn through the orchard or other locality containing the trees or other vegetation to be treated, and the pump is continuously operated by the engine 14. While the truck is passing between rows of the trees to be sprayed, valves 34 having first been opened, the operator presses upon the lever of valve 32, thereby opening communication from the discharge pipe to the conduits 17, and as the apparatus is drawn along the members 26 are reciprocated vertically by the cams 28, thereby imparting a corresponding up and down movement to the spray heads. In this manner a thorough spraying of the vegetation is obtained, the same being supplemented by the discharge from the supplemental spray pipes 35.

In lieu of reciprocating the actuator members by means of the cam, as shown in Figures 1 and 2, each drive wheel W may be provided with spaced apart projections 41, positioned to engage a lever 42 pivoted at one end to the side of the tank 12, as shown in Figure 5. The lower ends of the actuator members 26 rest upon the free ends of he levers 42, springs 43 being interposed between them, to break the shock upon the rods as the truck travels over its course.

If desired a single main conduit may be employed for spraying to either side, as shown in Figures 3 and 4. Referring to said figures, the conduit 17ª is rotatably mounted in brackets 45 extending rearwardly from the frame work 16ª and the tank 12ª respectively. Said conduit is provided with suitable nipples 22ª which are connected by flexible tubing T with members R', which are pivoted at one end to the conduit 17ª and provided at their free ends with spray heads 23ª. Each member R' passes through a loop 46 on an actuator member 26ª which is guided by means of braces 25ª secured to the brackets 45, said actuator member having a projection 47 near its lower end which rests upon a curved track 48. Said track is supported by a member 49 mounted for vertical reciprocation and guided by rods 50 engaging guides 51 secured to the rear of the tank. Reciprocation of member 49 is effected by means of cams 28ª upon which said member rests, said cams being carried by a shaft 27ª which is provided with a sprocket wheel 29ª driven by a chain 30ª actuated by a second sprocket wheel 31ª connected with one of the traction wheels. The conduit 17ª is connected to the delivery conduit 18ª by means of a flexible hose member 33ª and if desired may also be provided with a supplemental spray pipe similar to the pipe 35 shown in Figures 1 and 2.

In operation, the conduit 17ª is rotated in either direction to carry the spray heads and the actuator to the desired side, the projection 47 riding upon the track 48 during this movement. It is obvious that as the machine is propelled the actuator member 26ª will be reciprocated by the member 49 during its vertical reciprocations, and the desired spraying effect secured. It is to be understood, however, that Figure 3 illustrates the spray heads and the actuator member in an abnormal or intermediate position, i. e. one of the positions the parts assume while moving the spray heads from one side of the machine to the otther. This is done so that the parts may be more clearly shown.

The advantages of the invention will be readily understood by those skilled in the art to which it belongs. For instance, an important advantage is that a very simple and effective means is provided for imparting reciprocation to a plurality of nozzles, so that a very thorough spraying of vegetation is accomplished, means being provided to insure a uniform and complete coverage of the surfaces to be sprayed. Another advantage is that the device may be conveniently drawn from place to place and between rows of trees, as conditions require.

Having thus explained the nature of the invention and described an operative manner of constructing and using the same, although without attempting to set forth all of the forms in which it may be made, or all of the forms of its use, what is claimed is:—

1. A spraying apparatus comprising a movably supported tank, a vertically disposed conduit mounted on said tank, a spray head supported by said conduit and communicating therewith, said spray head being freely movable in a vertical plane, a vertically disposed slidably supported rod located adjacent to said conduit and connected with said spray head, and means operated by movements of the tank for imparting continuous reciprocations to said rod in a vertical plane during such movement, so as to oscillate the spray head.

2. A spraying apparatus comprising a movably mounted tank, a frame work mounted on said tank, a vertically disposed conduit supported in position by said frame work, means for supplying spray material from said tank to said conduit, a plurality of spray nozzles, flexible connections between the spray nozzles and said conduit, a vertically disposed actuator member movably connected with all of said spray nozzles, and means operated by movements of the tank for imparting continuous reciprocations to said actuator member during movement of the tank, so that the spray nozzles are reciprocated in vertical planes.

3. A spraying apparatus comprising a movably mounted tank, a frame work on said tank, a vertically disposed conduit supported in position by said frame work, means for supplying spray material from said tank to said conduit, a plurality of spraying nozzles each movably connected with the conduit and communicating therewith, operating members pivoted to said conduit and connected with the respective nozzles, said operating members being movable in vertical planes, and means operated by movements of the tank for imparting simultaneous and continuous oscillations to said operating members during such movement, so as to oscillate the nozzles in vertical planes.

4. A spraying apparatus comprising a movably supported tank, a vertically disposed conduit mounted on said tank and communicating therewith, a spray head communicating with said conduit and movable relative thereto, a pivoted operating arm mounted on said conduit and engaging said spray head, a vertically disposed slidably supported rod carried by said tank and connected with said operating member, and means operated by movement of the tank for imparting continuous reciprocations to said rod during such movement, so as to oscillate the spray head in a vertical plane.

5. A spraying apparatus comprising a movably supported tank, a conduit fixedly supported thereby, means for supplying spray material from said tank to the conduit, a spray head connected with said conduit by a flexible pipe, an operating member pivoted to said conduit and engaging said spray head, said operating member being oscillatable in a vertical plane, and means operated by movement of the tank for imparting continuous oscillations to said operating member during such movement so as to oscillate the spray head in a vertical plane.

6. A spraying apparatus comprising a movably supported tank, a vertically disposed conduit supported by said tank, and communicating therewith, vertically movable reciprocating means operated by movement of the tank, a spray head connected at one end with the conduit and communicating therewith, and means movably connecting the other end of the spray head with said reciprocating means, so that continuous oscillations are imparted to the spray head in a vertical plane during movement of the tank.

7. A spraying apparatus comprising a movably supported tank, a frame work mounted on said tank, a conduit supported in a vertical position by said frame work, means for supplying spray materials from said tank to said conduit, vertically reciprocating means operated by movement of the tank, a plurality of nozzles each connected at one end with said conduit and communicating therewith, said nozzles being movable in vertical planes, and means movably connecting the other ends of said nozzles with said reciprocating means, so that continuous oscillations are imparted to said nozzles in vertical planes during movement of the tank.

8. A spraying apparatus comprising a movably mounted tank, a vertically disposed conduit supported by said tank and communicating therewith, vertically movable reciprocating means, a spray head connected at one end with said conduit and communicating therewith, said spray head being movable in a vertical plane, a cam member rotatably supported by said tank and engaging said reciprocating means, and means operated by movement of the tank for actuating said cam member during such movement, so that continuous oscillations are imparted to the spray head in a vertical plane during movement of the tank.

9. A spraying apparatus comprising a movably supported tank, a frame mounted thereon, a vertically disposed conduit communicating with said tank, vertically movable reciprocating means operated by movement of the tank, a spray head connected at one end with said conduit and communicating therewith, means movably connecting the other end of said spray head with said reciprocating means, so that continuous oscillations are imparted to the spray head in a vertical plane during movement of the tank, and means including the frame for rotatively supporting said conduit, so that the spray head may be directed to either side of the tank.

10. A spraying apparatus comprising a movably supported tank, a conduit communicating with said tank, a vertically movable reciprocating member, a plurality of spray heads each connected at one end with the conduit and at the other end with said reciprocating member so as to be movable in vertical planes, means including a frame work on the tank for rotatively supporting the conduit so that the spray heads may be directed to either side of the tank, means positioned at opposite sides of the tank and operable during movement of the tank for imparting oscillations to said reciprocating member so that continuous oscillations are imparted to the spray head in a vertical plane during movement of the tank and irrespective of the side to which the spray heads are directed.

11. A spraying apparatus comprising a movably supported tank, a conduit communicating with said tank, a vertically movable reciprocating member, a plurality of spray heads movably connected at one end to said conduit and at the other end with said reciprocating member, so that the spray heads move in vertical planes, means for rotatively supporting the conduit so that the spray heads may be directed to either side of the tank, said reciprocating member being movable with said conduit, and means operated by movement of the tank for imparting successive reciprocations to said reciprocating member in its operative positions on either side of the tank.

12. A spraying apparatus comprising a movably supported tank, a conduit supported by said tank and communicating therewith, a plurality of spray heads connected at one end with said conduit, operating arms provided at one end to the conduit so as to oscillate in vertical planes and connected at their other ends with the respective spray heads, means for rotatively supporting the conduit so that the spray heads may be directed to either side of the tank, a reciprocating member mounted to conform to the rotative movements of the conduit and engaging the outer ends of the respective operating arms, and means operated by movement of the tank for imparting movement to said reciprocating member so as to impart successive oscillations to the spray heads in vertical planes while directed to either side of the tank, said operating means including means for engaging the reciprocating member in its operative positions on either side of the tank.

13. A spraying apparatus comprising a movably supported tank, a vertically disposed conduit communicating with said tank, an actuator rod, spray heads each connected at one end to said conduit, said heads also engaging said rod so as to be movable therewith, means for rotatively supporting said conduit so that the spray heads may be positioned to deliver spray material to either side of the tank, means supporting said actuator rod in spaced relation with respect to said conduit and in a manner to conform to the rotative movements of the conduit, an operating member supported by said tank and mounted for vertical reciprocation, means for reciprocating said operating member during movement of the tank, and means for maintaining an engagement between the operating member and the actuator rod while said rod is positioned at either side of the tank.

14. A spraying apparatus comprising a movably supported tank, a vertically disposed conduit communicating with said tank, an actuator rod, spray heads each connected at one end to said conduit, said heads also engaging said rod so as to be movable therewith, means for rotatively supporting said conduit so that the spray heads may be positioned to deliver spray material to either side of the tank, means supporting said actuator rod in spaced relation with respect to said conduit and in a manner to conform to the rotative movements of the conduit, a reciprocably mounted member carried by said tank and having a curved track, said actuator rod having a projection engaging said track during movement of the actuator member with the conduit, and means operated by movement of the tank for imparting reciprocations to said track carrying member, so as to impart vertical oscillations to the actuator rod while located at either side of the tank.

In testimony whereof I have hereunto set my hand.

HENRY J. MILLS.